(12) United States Patent
Agúndez Dominguez et al.

(10) Patent No.: US 8,255,736 B2
(45) Date of Patent: Aug. 28, 2012

(54) CONSISTENT AND FAULT TOLERANT DISTRIBUTED HASH TABLE (DHT) OVERLAY NETWORK

(75) Inventors: José Luis Agúndez Dominguez, Madrid (ES); Jesús Renero Quintero, Getafe Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 12/528,239

(22) PCT Filed: Feb. 22, 2007

(86) PCT No.: PCT/IB2007/000430
§ 371 (c)(1),
(2), (4) Date: Aug. 21, 2009

(87) PCT Pub. No.: WO2008/102195
PCT Pub. Date: Aug. 28, 2008

(65) Prior Publication Data
US 2011/0010578 A1    Jan. 13, 2011

(51) Int. Cl.
*G06F 11/00* (2006.01)
(52) U.S. Cl. ........................ 714/4.11; 709/222
(58) Field of Classification Search .................. None
See application file for complete search history.

(56) References Cited

U.S. PATENT DOCUMENTS

| | | | |
|---|---|---|---|
| 7,685,312 B1* | 3/2010 | Caronni et al. | 709/245 |
| 2004/0054807 A1 | 3/2004 | Harvey et al. | |
| 2004/0064693 A1* | 4/2004 | Pabla et al. | 713/168 |
| 2005/0063318 A1 | 3/2005 | Xu et al. | |
| 2005/0076137 A1 | 4/2005 | Tang et al. | |
| 2005/0187946 A1 | 8/2005 | Zhang et al. | |
| 2008/0005334 A1 | 1/2008 | Utard et al. | |

FOREIGN PATENT DOCUMENTS

EP    1587282 A2    10/2005

OTHER PUBLICATIONS

Anjali Gupta, Barbara Liskov, and Rodrigo Rodrigues. 2004. Efficient routing for peer-to-peer overlays. In Proceedings of the 1st conference on Symposium on Networked Systems Design and Implementation—vol. 1 (NSDI'04), vol. 1. USENIX Association, Berkeley, CA, USA, 9-9, pp. 1-3.*
I. Stoica, et al: "Chord: A Scalable Peer-to-peer Lookup Protocol for Internet Applications".

(Continued)

*Primary Examiner* — Scott Baderman
*Assistant Examiner* — Jason Bryan

(57) ABSTRACT

A peer-to-peer (P2P) system is described herein which has a distributed hash table (DHT) overlay network containing multiple DHT nodes each of which has a complete distributed DHT hash table which contains information identifying a specific range of hashes for each of the DHT nodes such that when anyone of the DHT nodes receives a query asking for a specific key then the queried DHT node interacts with their respective DHT table to determine which one of the DHT nodes is storing the specific key and to forward 'the query in one network hop to the particular DHT node which is storing the specific key. The P2P system can also implement one or more data-related mechanisms including a bootstrap mechanism, a replication mechanism, an update mechanism and a recover mechanism which enable fault-tolerant DHT nodes.

17 Claims, 5 Drawing Sheets

OTHER PUBLICATIONS

F. Kaashoek, et al "Koorde: A simple degree optimal distributed hash table." in International Peer-to-Peer Symposium, 2003.

D. Malkhi, et al "Viceroy: A scalable and dynamic emulation of the butterfly," in Proc. 21st ACM Symposium on Principles of Distributed Computing, 2002.

P. Maymounkov, et al "Kademlia: A peer-to-peer information system based on the xor metric," in Proceedings of International Peer-to-Peer Symposium, 2002.

S. Ratnasamy, et al "A scalable content addressable network," in Proceedings of ACM SIGCOMM 2001.

A. Rowstron, et al "Pastry: Scalable, decentralized object location, and routing for large-scale peer-to-peer systems," Lecture Notes in Computer Science, vol. 2218, pp. 329-350, 2001.

D. Karger, et al "Consistent hashing and random trees: Distributed caching protocols for relieving hot spots on the World Wide Web". In Proceedings of the 29th Annual ACM Symposium on Theory of Computing (El Paso, TX, May 1997), pp. 654-663.

3GPP TS 23.228, IP Multimedia Subsystem Stage 2, http://www.3gpp.org/ftp/Specs/html-info/23228.htm.

* cited by examiner

CONSISTENT AND FAULT TOLERANT DISTRIBUTED HASH TABLE (DHT) OVERLAY NETWORK

TECHNICAL FIELD

The present invention relates to a peer-to-peer (P2P) system with a consistent and fault tolerant distributed hash table (DHT) overlay network.

BACKGROUND

A P2P system has an architecture in which each node (e.g., workstation, computer) has equal or similar capabilities and responsibilities. The P2P system differs from a client/server architecture where some nodes are dedicated to serving other nodes. In the past, P2P systems have been applied to basic Internet routing and to applications such as Usenet News which is a worldwide bulletin board system that is accessed by millions of people daily through the Internet or through many online services. More recently, P2P systems have been applied to resource location applications by utilizing so-called overlay networks such as Gnutella, Freenet, Pastry, P-Grid, or DKS, on top of a physical network. Basically, all of these overlay networks provide a resource location service and on top of the physical network where different distributed application services can be realized, such as data management (search, insert, update, etc.). If desired, these distributed application services could directly use the physical network for managing their resources. However, using an overlay network has the advantage of supporting application specific identifier space and semantic routing, and offers the possibility to provide additional, generic services like supporting network maintenance, authentication, trust, etc., all of which would be very hard to integrate into and support at the physical network layer. Thus, the introduction of overlay networks (which is discussed in detail next) and self-management at the service-level were very important innovations to P2P systems.

Each overlay network has a group of nodes P that provide access to a set of resources R by mapping P and R to an application-specific identifier space I utilizing two functions $F_P: P \rightarrow I$ and $F_R: R \rightarrow I$. These mappings establish an association of resources R to nodes P using a closeness metric on the application-specific identifier space I. To enable access from any node P to any resource R a logical network is built, i.e., a graph is embedded into the application-specific identifier space I. Basically, each specific overlay network can be characterized by the decisions made on the following six key design aspects:

1. Choice of an identifier space I.
2. Mapping of resources R and nodes P to the identifier space I.
3. Management of the identifier space I by the nodes P.
4. Graph embedding (structure of the logical network).
5. Routing strategy.
6. Maintenance strategy.

In making these design decisions, one often attempts to address one or more of the following characteristics that can be associated with an overlay network:

Efficiency: The routing should preferably incur a minimum number of overlay hops (with a minimum physical distance) and the bandwidth (including the number and sizes of the messages) for constructing and maintaining the overlay network should preferably be kept minimal.

Scalability: The concept of scalability includes many aspects such as, for example, numerical scalability, i.e., where there can be very large numbers of participating nodes without significant performance degradation.

Self-organization: The lack of centralized control and frequent changes in the set of participating nodes requires a certain degree of self-organization, i.e., in the presence of churn the overlay network should preferably be adapted to self-reconfigure itself towards stable configurations. This theoretical approach is a stabilization requirement since external intervention typically is not possible.

Fault-tolerance: Participating nodes and network links can fail at any time but all of the resources should preferably still be accessible from all nodes. This is typically achieved by some form of redundancy. Basically, fault-tolerance implies that even if parts of the overlay network cease operation, then the overlay network should preferably still be able provide an acceptable service.

Cooperation: The overlay network depends on the cooperation of the nodes, i.e., nodes have to trust that the nodes they interact with will behave properly in respect to routing, exchange of index information, quality of service, etc. . . . .

To date, a wide range of algorithms, structures, and architectures for overlay networks have been proposed, integrating knowledge from many different communities, such as networking, distributed systems, databases, graph theory, agent systems, complex systems, etc. . . . . A DHT overlay network is one such overlay network which has been proposed to be used as a generic building block for large-scale distributed applications. The following documents discuss the traditional DHT overlay network in great detail (the contents of which are incorporated by reference herein):

Ion Stoicay et al., "Chord: A Scalable Peer-to-peer Lookup Protocol for Internet Applications", SIGCOMM'01, Aug. 27-31, 2001, San Diego, Calif., USA.

D. Malkhi et al., "Viceroy: A scalable and dynamic emulation of the butterfly," Proc. 21st ACM Symposium on Principles of Distributed Computing, 2002.

P. Maymounkov et al., "Kademlia: A peer-to-peer information system based on the xor metric," Proceedings of International Peer-to-Peer Symposium, 2002.

S. Ratnasamy et al., "A scalable content addressable network," in Proceedings of ACM SIGCOMM 2001, 2001.

Rowstron et al., "Pastry: Scalable, decentralized object location, and routing for large-scale peer-to-peer systems," Lecture Notes in Computer Science, vol. 2218, pp. 329-350, 2001.

Karger, D. et al. "Consistent hashing and random trees: Distributed caching protocols for relieving hot spots on the World Wide Web" Proceedings of the 29th Annual ACM Symposium on Theory of Computing (El Paso, Tex., May 1997), pp. 654-663.

Because, the set of participating nodes in the traditional DHT overlay network is assumed to be very large and dynamic, each of the node's views of the current set of participants are not synchronized since it would be too costly. Instead, the traditional DHT overlay network's approach is to simply form a routing overlay on which requests for data entries often require more than one network hop before reaching the particular nodes that are responsible for managing the requested data entries. This problem with the traditional DHT scheme is discussed below in greater detail with respect to FIGS. 1A-1B.

Referring to FIG. 1A (PRIOR ART), there is shown a diagram of an exemplary P2P system 100 which has ten traditional DHT nodes N1, N8 . . . N56. The DHT nodes N1, N8 . . . N56 each have a distinct DHT hash table 102 that is used to enable the following: (1) queries for a given identifier are passed around the given topology (a circle in this case) via successor pointers until they encounter a pair of nodes that straddle the desired identifier; and (2) the second in the pair of nodes is the node that the query maps to find the desired data entry. In the present example, the DHT node N8 has DHT hash table 102 which stores references to, addresses or identifiers of various DHT nodes N14, N21, N32 and N42 (see column 104) that it would query for a limited number of ranges of key values $8+2^0$, $8+2^1$, $8+2^2$ ... $8+2^5$ (see column 106). As can be seen, DHT node N8 has a DHT hash table 102 which stores references to, addresses or identifiers of only a small number of the DHT nodes N14, N21, N32 and N42, and knows more about DHT node N14 which is close to DHT node 8 on the identifier circle than about DHT nodes N21, N32 and N42 farther away. Second, it can be seen, that DHT node N8 does not have a DHT hash table 102 that contains enough information to determine the exact location of every possible key k (note: these particular features are also true with DHT nodes N1, N14 ... N56 and their respective DHT hash tables).

Referring to FIG. 1B (PRIOR ART), there is shown another diagram of the exemplary P2P system 100 in which DHT node N8 has received a query 108 (lookup key 54) and uses the DHT hash table 102 to determine that the query 108 needs to be forwarded to another DHT node N42 so it gets closer to its final destination which is DHT node 56. In this example, assume that DHT node N8 wants to find the successor of key 54. Since, the largest entry in the DHT hash table 102 of DHT node N8 that precedes key 54 is DHT node N42, then DHT node 8 will ask DHT node N42 to resolve the query 108 (see numeral "1"). In turn, DHT node N42 will determine the largest entry in its DHT hash table that precedes key 54, i.e., DHT node N51, DHT node N42 will ask DHT node 51 to resolve the query 108 (see numeral "2"). Next, DHT node N51 will discover after checking its DHT hash table that its own successor, DHT node N56, succeeds key 54, and thus will ask DHT node N56 to resolve the query 108 (see numeral "3"). Finally, DHT node N56 will return it's address 110 back to the originating DHT node N8 (see number "4"). As can be seen, this DHT request routing involved several network hops from DHT node N8 to DHT nodes N42, N51 and N56.

The several network hops it can take to resolve a query 108 is a fundamental problem with the traditional DHT overlay network 100. In fact, in the traditional DHT overlay network 100 which is operating in a steady state mode, each DHT node typically maintains information about only O(log N) other DHT nodes, and resolves all lookups via O(log N) messages/hops to other DHT nodes. Thus, when one tries to build faster, stronger, and more reliable DHT overlay network, which is more suited to be used in a trusted environment like the telecommunication environment, then there is a problem with the large number of network hops associated with the classical approach. This large number of network hops can bring the performance down in the telecommunication environment which typically has a limited number of telecommunication nodes (hardware and software) working in a network environment which is private, secure, trusted, and in which the nodes are near to each other network-wise, i.e. with very low latency. Accordingly, there is a need to address this problem and other problems which are associated with the classical DHT overlay network 100 when implementing DHT in a trusted environment like for instance the telecommunication environment. This need and other needs are satisfied by the present invention.

SUMMARY

In one aspect, the present invention provides a distributed hash table (DHT) overlay network which has a plurality of DHT nodes that form a peer-to-peer (P2P) system, where each DHT node has a complete distributed DHT hash table which contains information identifying a specific range of hashes for each of the DHT nodes such that when anyone of the DHT nodes receives a query asking for a specific key then the queried DHT node interacts with their respective DHT table to determine which one of the DHT nodes stores the specific key and if the queried DHT node does not store the specific key then the queried DHT node forwards the query in one network hop to the particular DHT node that is storing the specific key. The P2P system may also include one or more data-related mechanisms namely a bootstrap mechanism, a replication mechanism, an update mechanism, and a recover mechanism.

In another aspect, the present invention provides a method for configuring a DHT overlay network which has a plurality of DHT nodes that form a P2P system. The method includes the following steps: (1) implementing a bootstrapping mechanism where when each DHT node boots for a first time then having that booting DHT node broadcast a message announcing their capacity which then initiates one the following steps: (a) if the DHT overlay network at this time has no operating DHT nodes, then assigning the booting DHT node a first place in the DHT hash table and having the booting DHT node assume all hash ranges in the DHT hash table; (b) if the DHT overlay network at this time has only one operating DHT node, then having the one operating DHT node decide how to split the hash ranges in view of the announced capacity of the booting node and send a re-computed DHT hash table to the booting DHT node; and (c) if the DHT overlay network at this time has two or more operating DHT nodes, then having the operating DHT node which is first in the DHT hash table decide how to split the hash ranges in view of the announced capacities of the booting node and all of the operating DHT nodes and send a re-computed DHT hash table to the booting DHT node and the other operating DHT nodes.

In another aspect, the present invention provides a method for using a configured DHT overlay network which has a plurality of DHT nodes that form a P2P system. The method includes the steps of: (1) receiving, at one of DHT nodes, a query asking for a specific key; (2) interacting with a DHT table associated with the queried DHT node to determine which one of the DHT nodes stores the specific key; and (3) forwarding the query in one network hop to the particular DHT node that stores the specific key, wherein each of the DHT nodes have the same DHT hash table which contains information identifying a specific range of hashes for each of the DHT nodes.

In still yet another aspect, the present invention provides a DHT node with a complete distributed DHT hash table which is configured to contain information identifying a specific range of hashes for itself and to contain information identifying specific ranges of hashes for all of the other DHT nodes which are part of a DHT overlay network in a P2P system. The DHT node may also implement one or more data-related mechanisms namely a bootstrap mechanism, a replication mechanism, an update mechanism, and a recover mechanism.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 2:
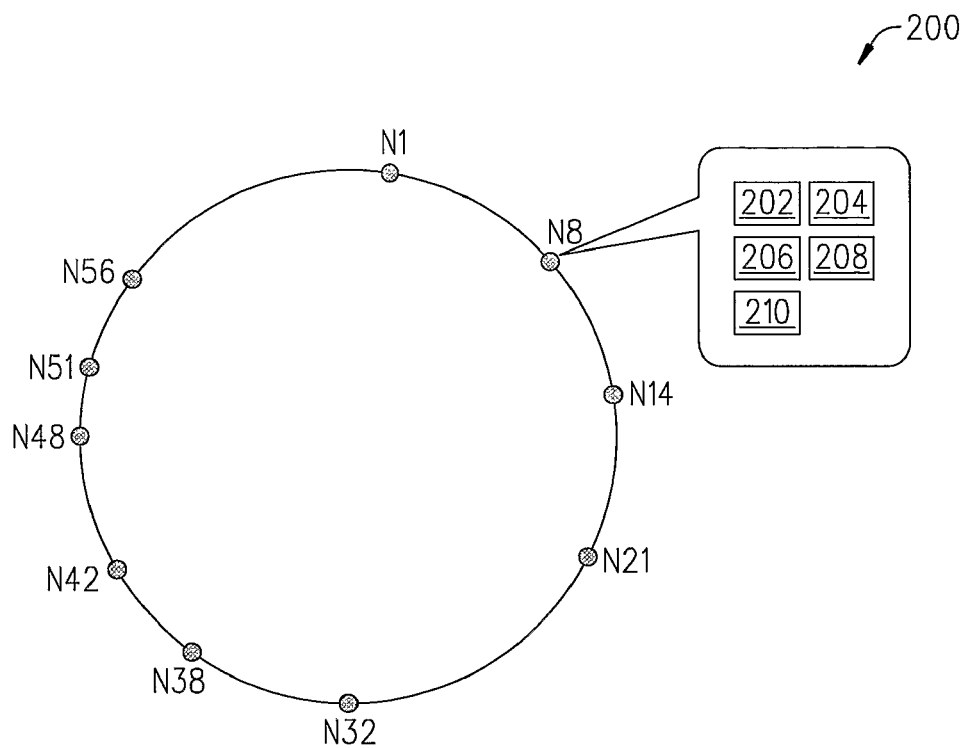
FIG. 2 is a diagram of an exemplary P2P system with a DHT overlay network which implements one or more new mechanisms to enable consistent and fault-tolerant DHT nodes in accordance with the present invention.

The present invention addresses the aforementioned problem and other problems by introducing a P2P system 200 with a DHT overlay network which implements one or more new mechanisms 202, 204, 206, 208 and 210 so as to have consistent and fault-tolerant DHT nodes N1, N8 . . . N56 (see the exemplary P2P system 200 illustrated in FIG. 2). These new mechanisms 202, 204, 206, 208 and 210 include an index-range management mechanism 202 which improves the distribution of index ranges within the DHT hash tables and also enables consistent DHT nodes N1, N8 . . . N56. This particular mechanism 202 is described in detail below and referred to herein as the:

Distributed DHT hash table mechanism 202

The new mechanisms 202, 204, 206, 208 and 210 also include four data-related mechanisms 204, 206, 208 and 210 which enable fault-tolerant DHT nodes N1, N8 . . . N56. These mechanisms 204, 206, 208 and 210 are described in detail below and referred to herein as the:

Bootstrap mechanism 204
    Replication mechanism 206 (DHT Data Modifications)
    Update mechanism 208 (DHT node crash)
    Recover mechanism 210 (DHT node restoration)

Note: The data-related mechanisms 204, 206, 208 and 210 can be applied independently of the index-range management mechanism 202.

Distributed Hash Table Mechanism 202

Figure 1A:
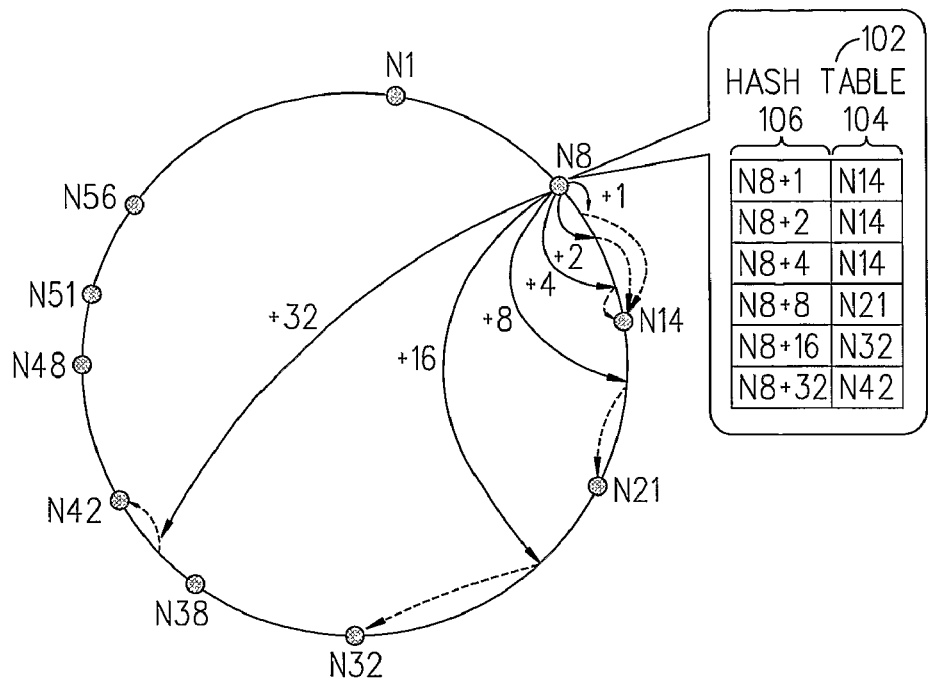
FIGS. 1A-1B (PRIOR ART) are two diagrams of an exemplary P2P system which is used to help explain one of the problems associated with implementing the traditional DHT protocol in a DHT overlay network.
Figure 1B:
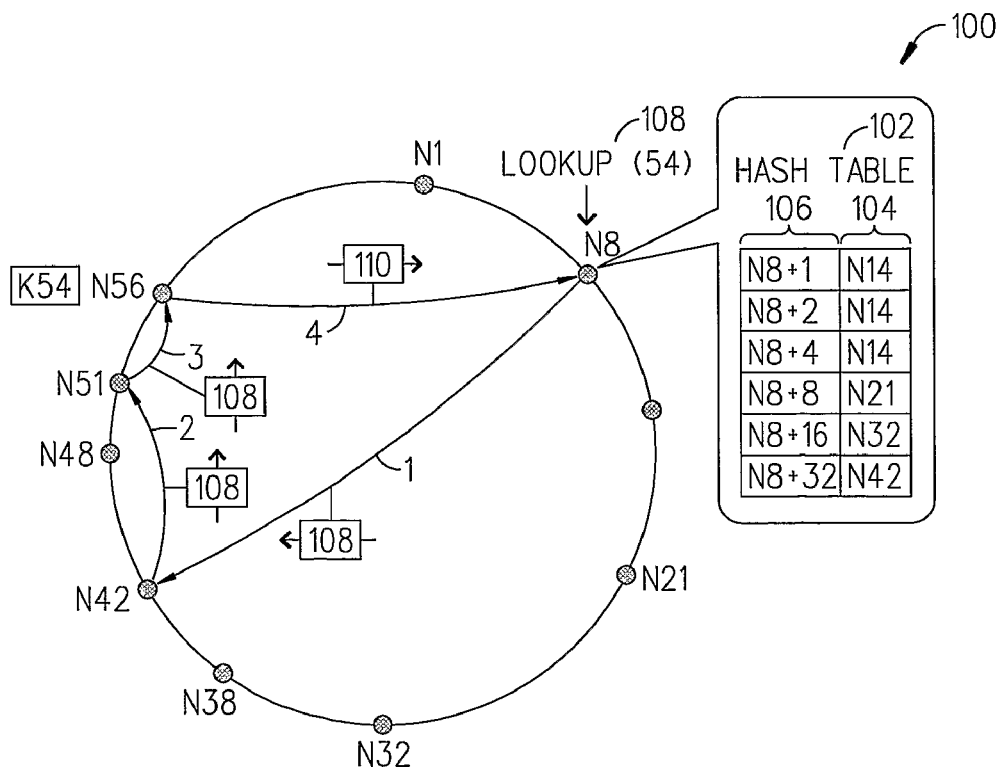

Each DHT node N1, N8 . . . N56 has a complete distributed DHT hash table 212 which includes the complete topology describing precisely which of the DHT nodes (see column 214) serve which range of hashes (see column 216). In particular, each DHT node N1, N8 . . . N56 has the same DHT hash table 212. In contrast, each traditional DHT node N1, N8 . . . N56 had a different DHT hash table 102 that contained partial information regarding "ranges of hashes" (see FIGS. 1A-1B).

Figure 3A:
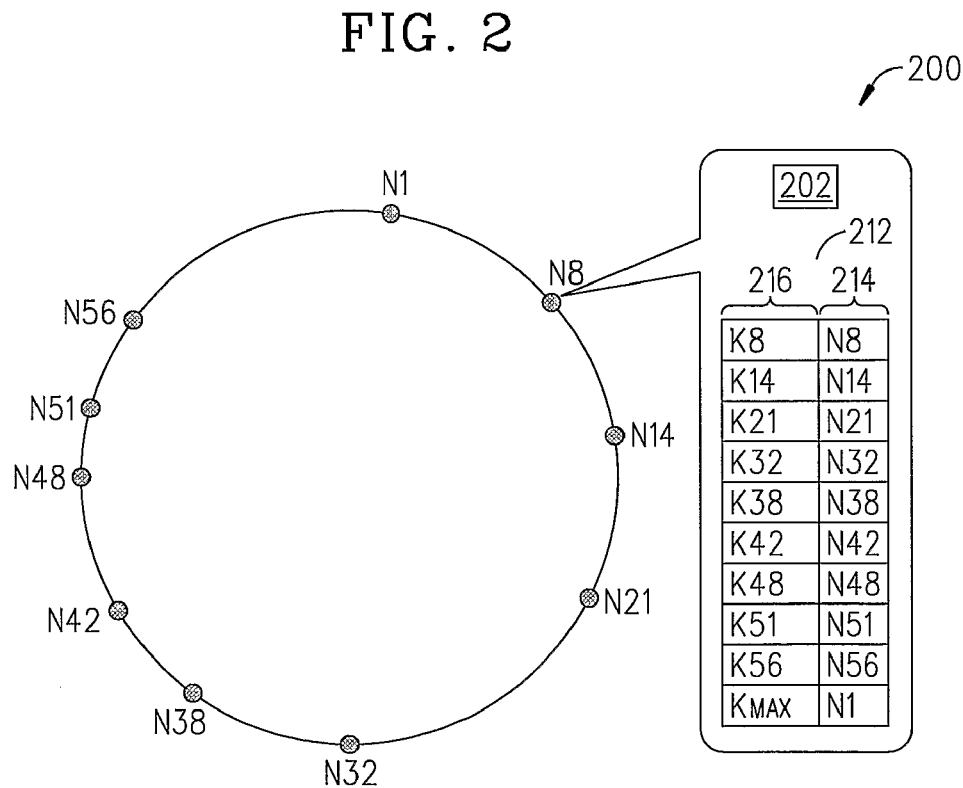
FIGS. 3A-3B are two diagrams of an exemplary P2P system which are used to help explain an index-range management mechanism in accordance with one embodiment of the present invention.
Figure 3B:
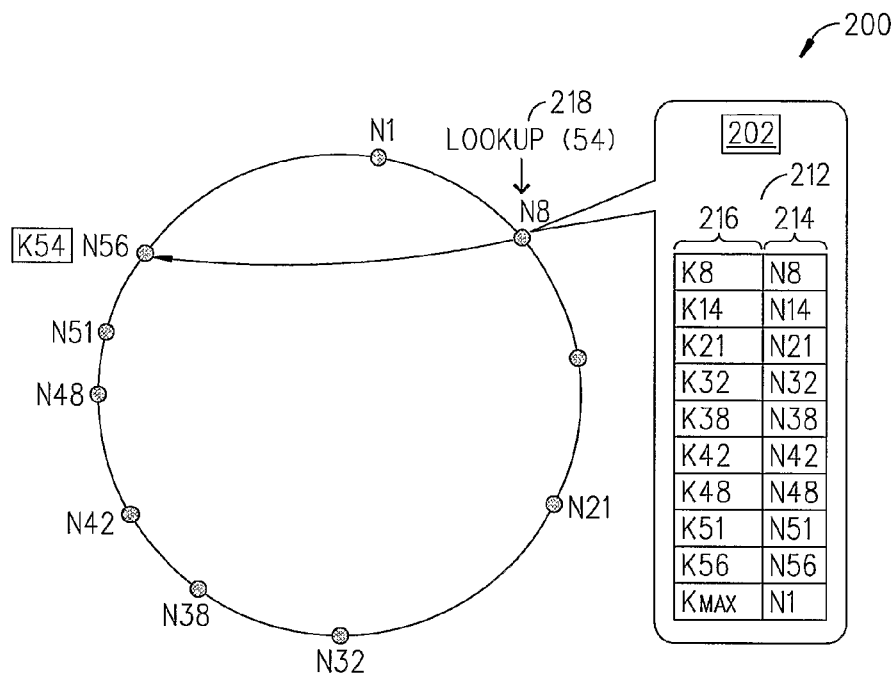

Referring to FIG. 3A, there is shown a diagram of the exemplary P2P system 200 which has ten traditional DHT nodes N1, N8 . . . N56 implementing the index-range management mechanism 202 in accordance with one embodiment of the present invention. The DHT nodes N1, N8 . . . N56 each have a complete distributed DHT hash table 212 so that each DHT node N1, N8 . . . N56 has immediate knowledge about which DHT node N1, N8 . . . N56 to ask for a given hash value (note: only the DHT hash table 212 associated with DHT node N8 is shown in FIG. 3A). In FIG. 3B, assume a query 218 arrives at DHT node N8, asking for key 54, the DHT node N8 then interfaces with the DHT hash table 212 and directly knows that keys ranging from 51+1 to 56 are stored in DHT node 56. As can be seen, this precise information allows an incoming request to be forwarded by a DHT node N8 (for example) in just one network hop to the DHT node 56 (for example) that is taking care of a given hash, thus improving performance as less extra hops are involved to reach a request's target data (compare to FIGS. 1A-1B). Note: the operation of this index-range management mechanism 202 assumes a number of DHT nodes are already configured and the overlay network has already been "built-up" and ready to function in a normal operating condition. The following description about a bootstrap mechanism 204 however is just one way that can be used to establish/build-up a P2P system/ DHT overlay network that can then utilize the index-range management mechanism 202 and other mechanisms 206, 208, 210 and 212.

Bootstrap Mechanism 204

The DHT overlay network implements the bootstrapping mechanism 204 to help enable fault-tolerant DHT nodes N1, N8 . . . N56. In one embodiment, the bootstrapping mechanism 204 was designed while taking into account three different factors:

1. Fault tolerance: The whole P2P system 200 should preferably be enabled to automatically boot at first or anytime after maintenance has been performed or a severe crash. The individual DHT nodes N1, N8 . . . N56 share a common network, and should preferably be separated by an insignificant network distance to enable the viability of diffusion mechanisms (multicast or broadcast messages).

2. No singularity. All of the DHT nodes N1, N8 . . . N56 in the P2P system 200 are preferably similar, which means that no DHT node plays a different role from the rest of DHT nodes in the P2P system 200.

3. Simplicity. The P2P system 200 was conceived with simplicity in mind. This implies that the bootstrap mechanism 204 might not be substantially different from a normal write operation, as will be explained below.

Based on these factors, an exemplary bootstrapping mechanism 204 was designed to behave as follows:

I. Once, a DHT node boots, it knows how much storage capacity it has, and nothing else.

II. The booting DHT node sends a broadcast message, announcing its capacity to the operating DHT node(s).

a. If the P2P system 200 has no operating DHT node(s) yet, then the booting DHT node will be assigned the $1^{st}$ place in the DHT hash table 212. In addition, the booting DHT node will assume 100% of the ranges in the hash space.

b. If the P2P system 200 has only one operating DHT node, then that operating DHT node receives the broadcast message and decides how to split the key/hash space in the DHT table 212 according to it's capacity and the capacity of the booting DHT node. Once calculated, the operating DHT node replies to the booting DGT node with the updated DHT hash table 212.

c. If the P2P system 200 has two or more operating DHT nodes, then those operating DHT nodes all receive the broadcast message but only the first operating DHT node in the DHT hash table 212 takes the initiative and the rest of the operating DHT nodes will simply discard the broadcast message. The first operating DHT node then re-computes the DHT hash table 212 to include the newcomer booting DHT node. Plus, the first operating DHT node decides how to split the key/hash space in the DHT hash table 212 according to it's capacity and the capacities of the other operating DHT node(s) and the booting DHT node. Then, the first operating DHT node can use for example a recursive direct response routing (RDRR) mechanism to propagate the updated DHT hash table 212 to the other operating DHT node(s) and the newcomer booting DHT node. In one embodiment, the RDRR mechanism functions to send the updated DHT table 212 to the next DHT node, in increasing order of direction based on the updated DHT hash table 212, recursively (see FIG. 4A).

Once the updated DHT hash table 212 is received, then the booting DHT node finalizes the "bootstrap mode" and starts the "operating/normal mode" where it can now start to receive requests.

Figure 4:
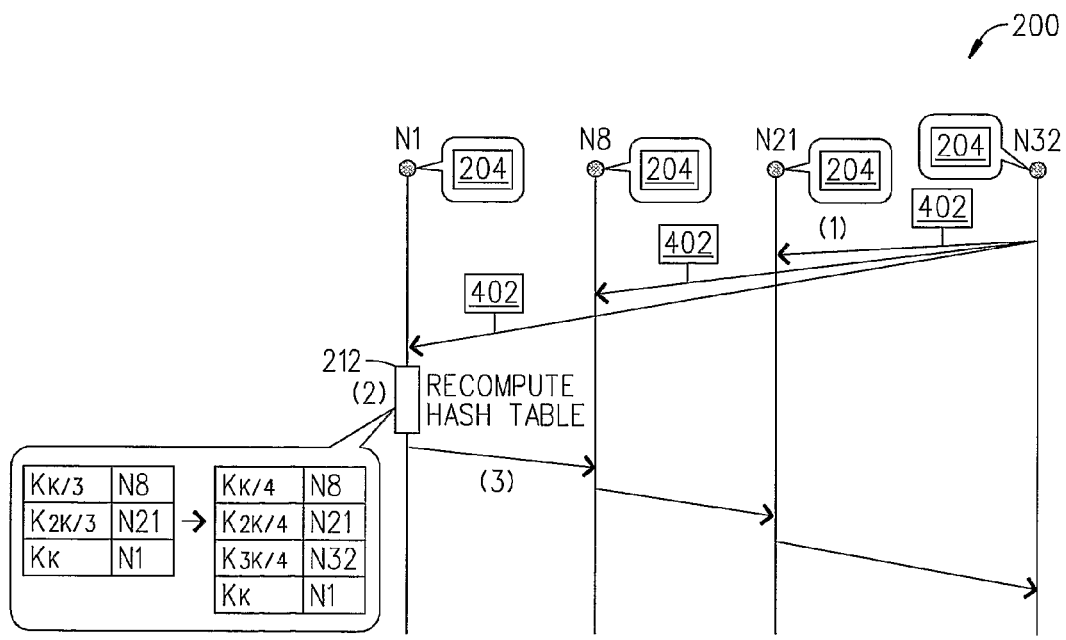
FIG. 4 is diagram of an exemplary P2P system which is used to help explain a bootstrap mechanism in accordance with another embodiment of the present invention.

Referring to FIG. 4, there is shown a diagram which illustrates four of the DHT nodes N1, N8, N21 and N32 within the exemplary P2P system 200 which is used to help explain the function of the bootstrap mechanism 204 when DHT node N32 (for example) is booting up in accordance with another embodiment of the present invention. In step "1", when the booting DHT node N32 boots-up it sends a broadcast message 402 (which announces its new state and capabilities) to the operating DHT nodes N1, N8 and N21 (note: DHT nodes N38, N42, N48, N51 and N56 for simplicity have not been shown in this example). In step "2", the operating DHT node N1 (which is the first node in the DHT hash table 212) upon receiving the broadcast message 402 has the responsibility to update the DHT hash table 212 while taking into account the capabilities of the booting DHT node N32 and the other operating DHT nodes N8 and N21 (note: DHT nodes N8 and N21 discard the broadcast message 402). For example, assume each DHT node N1, N8, N21 and N32 have equal capacity for a range of k keys, then the DHT hash table 212 would be updated as indicated in FIG. 4 (see exploded view in which the original DHT hash table 212 is shown on the left and the updated DHT hash table 212 is shown on the right). In step 3, once the operating DHT node N1 updates the DHT hash table 212 then it is recursively redirected via the RDDR mechanism to the ring member DHT nodes N8, N21 and N32. Upon receiving the updated DHT hash table 212, every DHT node N8, N21 and N32 overrides its previous DHT hash table 212 with the updated DHT hash table 212.

Note: The initial population of the P2P system 200 with data can be achieved by running simple clients, which massively launch write operations to the DHT nodes. This population could be based on an external storage that feeds the clients with the initial values to be written in the DHT hash tables. Alternatively, the P2P system 200 can be populated with data by using individual write operations during its normal use but this may not be as efficient as using an external storage to supply the data to the DHT nodes (note: the population of the P2P system 200 would be performed after the "build-up" step or in the above example after the bootstrap mechanism 202 has been implemented to initially configure the P2P system 200).

Replication Mechanism 206 (DHT Data Modifications)

The DHT overlay network can also implement the replication mechanism 206 to ensure that data is formally replicated in one or more replica DHT nodes. To enable the formal replication of data, the DHT hash table 212 previously described is used to find not the only the DHT node handling a range of hashes, but also to determine which DHT node(s) holds the replica for that same range of hashes. A detailed discussion about the replication mechanism 206 is provided next using the aforementioned exemplary P2P system 200.

Figure 5:
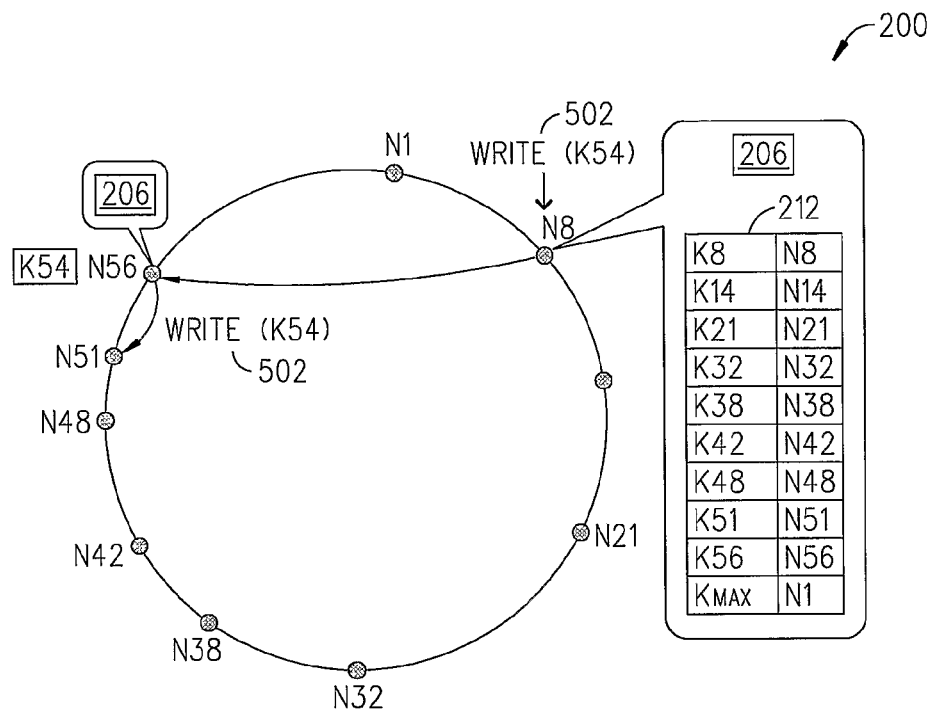
FIG. 5 is a diagram of an exemplary P2P system which is used to help explain a replication mechanism in accordance with yet another embodiment of the present invention.

Referring to FIG. 5, there is shown a diagram illustrating the exemplary P2P system 200 which is used to help explain the function of the replication mechanism 206 which ensures that data is formally replicated in one or more replica DHT nodes in accordance with another embodiment of the present invention. In this example, a write request (K54) 502 arrives at DHT node N8 which interacts with its DHT hash table 212 and forwards the request 504 which is to write over key 54 to DHT node N56 (which is holding the requested key-values). The DHT node N56 addresses the write request (K54) 502 and then in accordance with the replication mechanism 206 re-forwards the write request (K54) 502 to their predecessor DHT node N51 (note: the write request (K54) 502 can be forwarded to other DHT node(s) if desired as will be discussed in more detail below). In this particular example, the distributed DHT hash table 212 is not changed, but it is used to locate the predecessor DHT node N51 (which is associated with DHT node N56).

The predecessor DHT node N51 upon performing the write request (K54) 502 effectively acts as a replica of DHT node N56. Thus, each DHT node N1, N8 . . . N56 upon implementing the replication mechanism 206 is able to function as a replica of another DHT node and as a result every DHT node has a two-fold behavior: (1) main node or active part for a range of keys; and (2) a replica or passive part of a main node. In the present example, the DHT node N51 acts as main node for keys ranging from 49 to 51, and also acts as a replica for keys ranging from 52 to 56.

The replication mechanism 206 can be repeated so each DHT node has as many replicas as needed, in order to satisfy the needs of each P2P system 200. Thus, any given DHT node could act as a main or active node for a range of hashes, and can additionally have one, two, three or more passive replicas. In this example, if there are multiple passive replicas, then each new replica R+1 would behave as DHT node 56, with the previous replica R being DHT node 51. In case of a DHT node failure, the replica chain would be obtained from the DHT hash table 212, and followed until a working replica was found to process the request.

In the example shown in FIG. 5, a replica-location function (e.g., Topology-Based Replica Location (TRL) function (TRL)) was used to determine which DHT node acts as the replica node for another DHT node which in this particular case was the predecessor DHT node. In this case, the TRL replica-location function has several features including: (1) all DHT nodes may agree to use the TRL function at system startup; and (2) the TRL function may use local information to perform its computations, avoiding the use of pre-configured information or dependencies with other especial nodes that are located outside the P2P system 200. This means that any DHT node may be enabled to autonomously perform the TRL function, without the need to consult any other DHT node, or receive any extra data other than what was provided at startup. However, it should be noted that different topology or geographically metrics might be used by any replica-location function to determine what DHT node to re-forward a write request to after the write request has been received by the main DHT node (or a previous replica DHT node).

Update Mechanism 208 (DHT Node Crash)

The DHT overlay network can also implement the update mechanism 208 to ensure that if a DHT node crashes then it's requests will be served by their replica DHT node. In this embodiment, when a DHT node crashes then the DHT hash table 212 will be updated and re-distributed to all of the DHT nodes, so that the requests that would have been previously served by the crashed DHT node will now be addressed to and served by the replica of the crashed DHT node. The update mechanism 208 can function regardless of type of operation (read, write, etc) that is requested of the crashed DHT node.

Figure 6A:
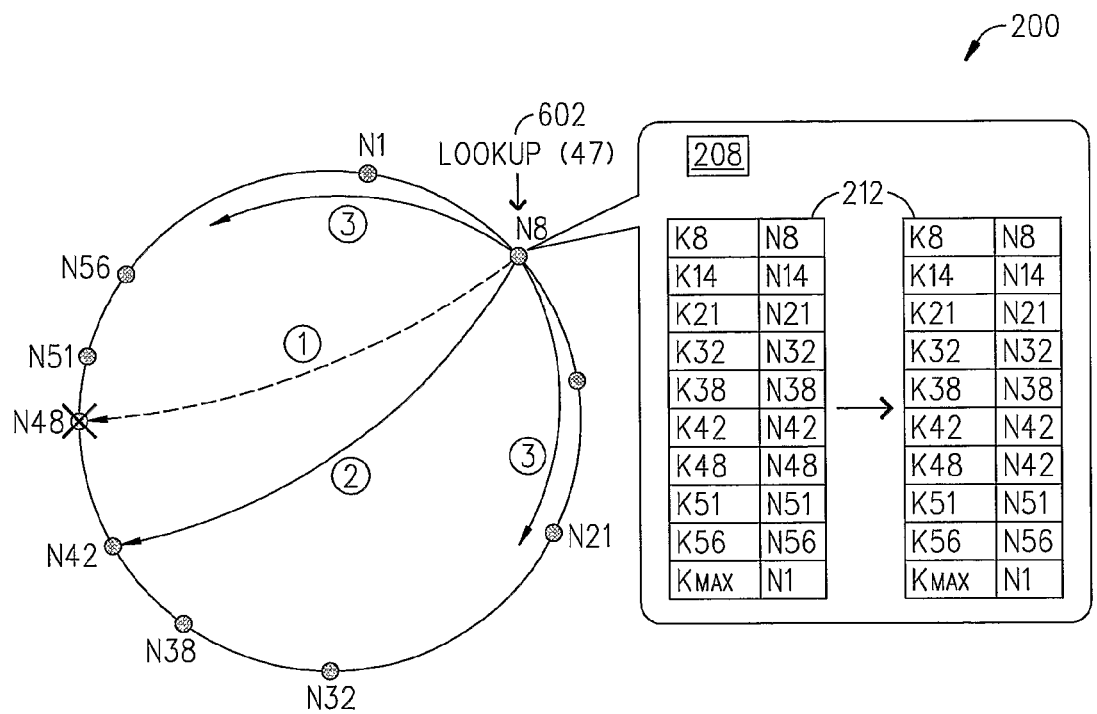
FIGS. 6A-6B are two diagrams of an exemplary P2P system which are used to help explain an update mechanism in accordance with still yet another embodiment of the present invention.

Referring to FIG. 6A, there is shown a diagram illustrating the exemplary P2P system 200 which is used to help explain the function of the update mechanism 208 which is to ensure that if a DHT node crashes then it's requests will be served by their replica in accordance with another embodiment of the present invention. In this example, a lookup/read request (K47) 602 arrives at DHT node N8 which interacts with its DHT hash table 212 (left side) and forwards this request to lookup data associated with key 47 to DHT node N48 (which is holding the requested key-values) (see step "1"). However, DHT node N48 has crashed so DHT node N8 will not get a valid reply in a given time, or will not receive an agreed acknowledgment. Under these circumstances, DHT node N8 applies the TRL function, marks the DHT node N48 as faulty, and re-sends the read request 602 to the corresponding replica DHT node based on the given topology-related relationship (for instance, in this example this DHT node is the predecessor DHT node N42) (see step "2"). Prior to sending the read request 602 to the replica DHT node N42, the DHT node N8 informs all of the operating DHT nodes N1, N14 . . . N58 in the topology about the changes to the DHT hash table 212 (see step "3"). In this example, this implies that the position in the DHT hash table 212 of the crashed DHT node N48 will be overridden by the replica DHT node N42 (see exploded view where the original DHT hash table 212 is shown on the left and the updated DHT hash table 212 is shown on the right) (note: the replication mechanism 206 makes it possible to implement the update mechanism 208).

The updated mechanism 208 that instructs a DHT node to re-direct (or directly send) those queries associated with a crashed node to the replica DHT node could be designed based upon three assumptions:

A topology is defined in the DHT overlay network: This means that from the distribution of the DHT nodes one can define basic functions such as predecessor or successor, which are applicable to every DHT node. In this way, the TRL function can be applied by every DHT node.

A broadcast/multicast mechanism is applicable: This means that every DHT node is enabled to send special control messages which affect all the DHT nodes in the P2P system 200. These control messages should preferably have priority over some other pending/queued requests.

Every message that is sent between any two DHT nodes of the DHT overlay network, for example, from DHT node A to DHT node B, may result in an acknowledgement message (ACK) being sent back from DHT node B to DHT node A, so it is possible to be able to recognize node failures.

Figure 6B:
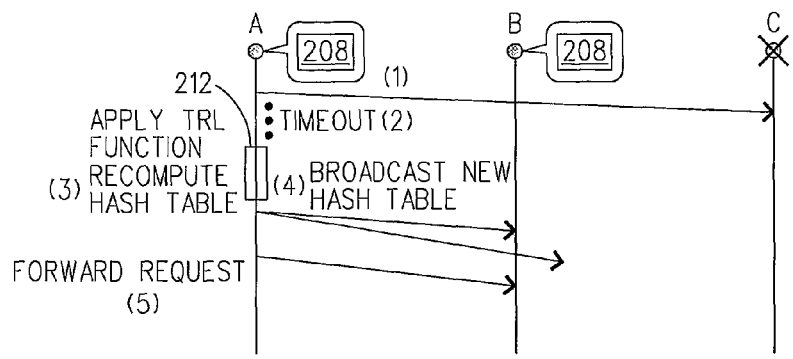

Referring to FIG. 6B, there is shown a flow diagram illustrating three DHT nodes A, B and C which are used to help explain the function of the update mechanism 208 in accordance with the present invention. In this case, the steps followed when a DHT node crashes are as follows:

1. The DHT node A sends a normal request (any type of request) to the corresponding DHT node C, which happens to be crashed.

2. The DHT node A detects that DHT node C is down after noticing after a certain period of time that it has not received a response from DHT node C. This timeout situation can be set-up in the P2P system by taking into account a maximum possible delay.

3. Since, DHT node A is the first node which has noticed that DHT node C has crashed, it re-computes the DHT hash table 212 to substitute DHT node C with the replica DHT node B after applying the TRL function.

4. The new DHT hash table 212 is broadcast from node A to all of the operating DHT nodes. Every DHT node prioritizes broadcast messages (control messages) over queued requests which enables them to quickly replace their old DHT hash table 212 with the new DHT hash table 212.

5. Now, DHT node A comes back to the normal situation and forwards the previously failed request to replica DHT node B.

Recover Mechanism 210 (DHT Node Restoration)

Once a crashed DHT node is restored (while its replica is responding to its requests), there may be a controlled handover process to swap back the roles of the replica DHT node and the crashed DHT node. The recover mechanism 210 can be used to implement this controlled handover process. As an example, let DHT node A be the node that crashed, and now is attempting to come back to a normal operating mode, and DHT node B be the replica of it. When DHT node A starts up, it will broadcast its capacity following the normal startup behavior (note: the P2P system is in the "normal operation mode" and not in "bootstrapping mode" which means that there is no DHT node in charge of coordinating the bootstrapping instead all of the DHT nodes will behave equally). So, the DHT node that will pay attention to DHT node A's message will be the replica DHT node B, which is in need of help, as it has been doubly loaded since DHT node A crashed and has been waiting for such a message. This implies that DHT nodes have a means of being identified uniquely (i.e. fixed Internet Protocol (IP) address, Media Access Control (MAC) address, etc.) so that DHT node B can notice that DHT node A which is announcing its comeback is the same old pre-crashed DHT node A by noticing DHT node A's unique identifier in the startup broadcast message.

Figure 7:
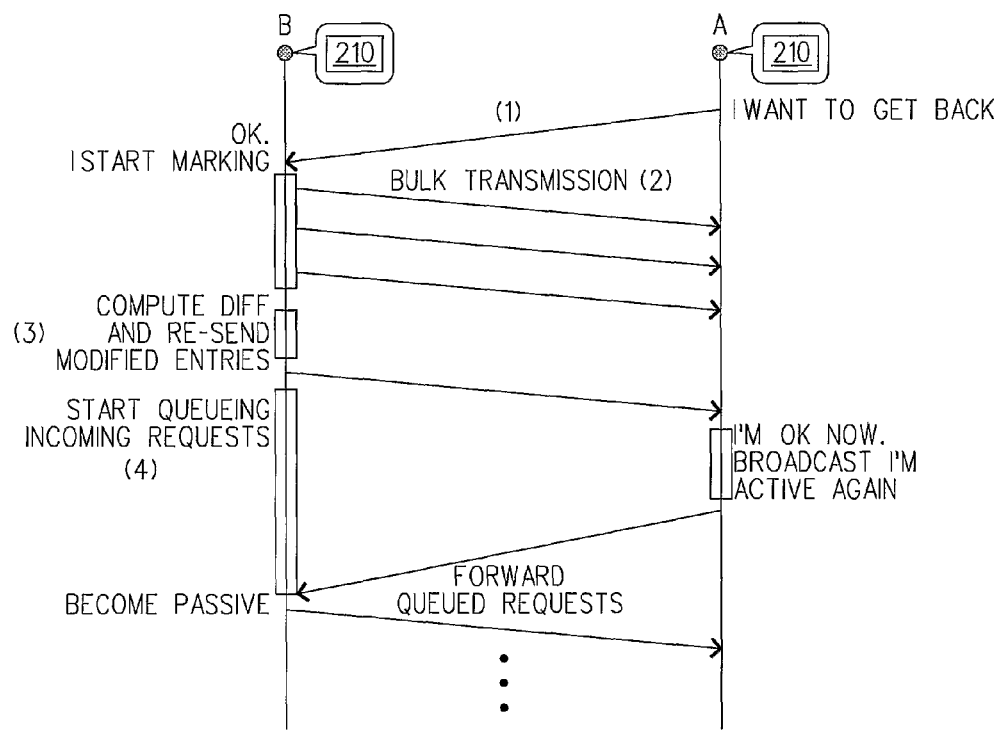
FIG. 7 is a diagram of two DHT nodes which is used to help explain a recover mechanism in accordance with yet another embodiment of the present invention.

Referring to FIG. 7, there is shown a flow diagram illustrating two DHT nodes A and B which are used to help explain the function of the recover mechanism 210 in accordance with the present invention. In this case, the steps followed when a crashed DHT node recovers are as follows:

1. First, restoring DHT node A notifies DHT node B that it is attempting to get back.

2. DHT node B acknowledges the new situation by starting to mark every incoming write or delete request (from that point in time, onwards), and bulk sending all of old DHT node A's replicated records to the recovering DHT node A (assuming DHT node A is starting from scratch).

3. Once, DHT node B finishes the bulk transfer to DHT node A, DHT node B transmits to DHT node A only those records which have been marked, as a consequence of receiving and performing a write/delete operation while sending the first set of replicated records to DHT node A. This second refresh operation may preferably be much shorter than the first refresh operation in step 2.

4. At this moment, DHT node B stops attending to incoming requests for the previously crashed DHT node A and instead stores those requests in a queue. At the same time, DHT node A sends a broadcast/multicast message to the P2P system, indicating that it is active, and will be responsible for a set of ranges that was previously being handled by replica DHT node B in the distributed DHT hash table 212.
5. Upon reception of this message, DHT node B starts flushing out its queue towards DHT node A, which is in the right condition to handle queries again.

Note: this example assumes an uninterrupted flow of requests are arriving to the P2P system 200, and precisely to the active DHT node B.

From the foregoing, it should be appreciated that the present invention improves the distribution of index ranges across a discrete number of DHT nodes and adds reliable replication and recovery of data which differs from the previous DHT state-of-the-art, which was conceived for a vast and continuously changing number of unreliable DHT nodes in the P2P system. The present invention mainly focuses on adjusting DHT to a trusted-environment in which the number of participating DHT nodes is discrete and stable, and the DHT nodes have strong reliability and performance requirements.

In the present invention, the DHT hash table found in each DHT node will now, instead of including partial information regarding "ranges of hashes", include the complete topology which describes precisely which DHT nodes serve which range of hashes. With this modified DHT hash table, each DHT node has an immediate knowledge of which DHT node to ask for a given hash value. This precise information allows incoming requests to be forwarded in just one network hop to the DHT node responsible for taking care of a given hash, thus improving performance as less hops are involved to reach a request's target data.

In addition to that, to prevent the current situation in the prior art where data is not formally but randomly replicated, a replication mechanism 206 was described above which can be used to automatically forward data modifications to a replica DHT node and enable the whole P2P system to quickly adapt to the new situation by refreshing the DHT hash tables. Incase a DHT node crashes, an update mechanism 208 can be used to ensure that the DHT hash table is updated and re-distributed to all DHT nodes, so that the requests that would have been previously served by the crashed node would now be addressed to their replica DHT node.

Furthermore, the present invention presented a recover mechanism 210 which can be used to help recovery after a DHT node-crash. The recover mechanism 210 described above is focused on data consistency, that is, no data is to be lost during the period when a DHT node is down and is recovering. This implies synchronization of the changes to the data which happened during the failure, and restoration of the processing and storage resources. In this way, while the previously described mechanisms 202, 204, 206 and 208 prevent disruptions to data access, the recovery mechanism 210 provides a process of restoring the situation after the crash DHT node recovers and becomes a functional DHT node again.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as set forth and defined by the following claims.

The invention claimed is:

1. A distributed hash table (DHT) overlay network which has a plurality of DHT nodes that form a peer-to-peer (P2P) system, where each DHT node has a complete distributed DHT hash table which contains information identifying a specific range of hashes for each of the DHT nodes such that when anyone of the DHT nodes receives a query asking for a specific key the queried DHT node interacts with their respective DHT table to determine which one of the DHT nodes stores the specific key and if the queried DHT node does not store the specific key then the queried DHT node forwards the query in one network hop to the particular DHT node that is storing the specific key, said DHT overlay network comprising:
    said DHT nodes for implementing a bootstrapping mechanism where when each DHT node boots for a first time then that booting DHT node broadcasts a message announcing the booting DHT node's capacity; and
        if said DHT overlay network has no operating DHT nodes, then the booting DHT node is assigned first place in the DHT hash table and assumes all hash ranges in the DHT hash table; or
        if said DHT overlay network has only one operating DHT node, then the one operating DHT node, upon receiving the broadcast message, decides how to split the hash ranges according to the announced capacity of the booting DHT node and then sends a re-computed DHT hash table to the booting DHT node; or
        if said DHT overlay network has two or more operating DHT nodes, then the operating DHT node which is first in the DHT hash table, upon receiving the broadcast message, decides how to split the hash ranges according to the announced capacities of the booting DHT node and all of the operating DHT nodes and then sends a re-computed DHT hash table to the booting DHT node and the other operating DHT nodes.

2. The DHT overlay network of claim 1, wherein said operating node uses a recursive direct response routing (RDRR) function to send the re-computed DHT hash table to the booting DHT node and the other operating DHT nodes.

3. The DHT overlay network of claim 1, wherein said DHT overlay network and said DHT nodes implement a replication mechanism where at least one of the DHT nodes acts as a main node for a first range of hashes and also acts as a replica node for a second range of hashes.

4. The DHT overlay network of claim 1, wherein said DHT overlay network and said DHT nodes implement an update mechanism where when one of the DHT nodes crashes, the DHT node that learned about the crashed DHT node functions to:
    update the DHT hash table so that requests that would have been previously served by the crashed DHT node would now be served by one of the DHT nodes which has a replica part in the DHT hash table that contains information identifying the range of hashes for the crashed DHT node; and
    redistribute the updated DHT hash table to the remaining DHT nodes.

5. The DHT overlay network of claim 4, wherein the DHT node that learned about the crashed DHT node uses a topology-based replica TRL function to determine the one of the DHT nodes which is to have the replica part in the DHT hash table that contains information identifying the range of hashes for the crashed DHT node, wherein said DHT node autonomously performs the TRL function without consulting any other DHT node or receiving any extra data other than data that was provided at startup.

6. The DHT overlay network of claim 1, wherein said DHT overlay network and said DHT nodes implement a recover mechanism where when one of the DHT nodes that crashed has been restored the replica DHT node that is serving requests the restored DHT node is informed and functions to:
   mark every received write or delete request associated with the restored DHT node;
   send replicated records associated with the restored DHT node back to the restored DHT node;
   transmit record/s that have been changed in response to receiving the marked write or delete request/s to the restored DHT node;
   store and not attend to subsequently received write or delete request/s associated with the restored DHT node;
   receive a message indicating that the restored DHT node is now active;
   update the DHT hash fable to indicate that the restored DHT node is now active; and
   send the stored subsequently received write or delete request/s associated with the restored DHT node to the restored DHT node.

7. A method for using a configured distributed hash table (DHT) overlay network which has a plurality of DHT nodes that form a peer-to-peer (P2P) system, wherein each DHT node has a complete distributed DHT hash table which contains information identifying a specific range of hashes for each of the DHT nodes, said method comprising the steps of:
   receiving, at one of the plurality of DHT nodes a query asking for a specific key;
   interacting with a DHT table associated with the queried DHT node to determine which one of the plurality of DHT nodes stores the specific key;
   forwarding the query in one network hop to the particular DHT node that stores the specific key; implementing a bootstrapping mechanism where when each DHT node boots for a first time, instructing that booting DHT node to broadcast a message announcing the DHT node's capacity which then initiates one the following steps:
      if said DHT overlay network has no operating DHT nodes, assigning the booting DHT node a first place in the DHT hash table and having the booting DHT node assume all hash ranges in the DHT hash table, or
      if said DHT overlay network has only one operating DHT node, having the one operating DHT node decide how to split the hash ranges according to the announced capacity of the booting node and send a re-computed DHT hash table to the booting DHT node, or
   if said DHT overly network has two or more operating DHT nodes, having the operating DHT node which is first in the DHT hash table decide how to split the hash ranges according to the announced capacities of the booting node and all of the operating DHT nodes and send a re-computed DHT hash table to the booting DHT node and the other operating DHT nodes.

8. The method of claim 7, wherein said operating node further includes a step of using a recursive direct response routing (RDRR) function to send the recomputed DHT hash table to the booting DHT node and the other operating DHT nodes.

9. The method of claim 7, further comprising a step of implementing a replication mechanism where the plurality of DHT nodes has at least one DHT node that acts as a main node for a first range of hashes and also acts as a replica node for a second range of hashes.

10. The method of claim 7, further comprising a step of implementing an update mechanism where when one of the plurality of DHT nodes crashes then the DHT node that learned about the crashed DHT node implements the following steps:
   updating the DHT hash table so that requests that would have been previously served by the crashed DHT node would now be served by one of the DHT nodes which has a replica part in the DHT hash table that contains information identifying the range of hashes for the crashed DHT node; and
   re-distributing the updated DHT hash table to the remaining DHT nodes.

11. The method of claim 10, wherein the DHT node that learned about the crashed DHT node uses a topology-based replica (TRL) function to determine the one of the DHT nodes which is to have the replica part in the DHT hash table that contains information identifying the range of hashes for the crashed DHT node, wherein said DHT node autonomously performs the TRL function without needing to consult any other DHT node, or needing to receive any extra data other than data provided at startup.

12. The method of claim 7, further, comprising a step of implementing a recover mechanism where when one of the plurality of DHT nodes that crashed has been restored, the replica DHT node that is serving requests for the restored DHT node implements the following steps:
   marking every received write or delete request associated with the restored DHT node;
   sending replicated records associated with the restored DHT node back to the restored DHT node;
   transmitting record/s that have been changed in response to receiving the marked write or delete request/s to the restored DHT node;
   storing and not attending to subsequently received write or delete request/s associated with the restored DHT node;
   receiving a message indicating that the restored DHT node is now active;
   updating the DHT hash table to indicate that the restored DHT node is now active; and
   sending the stored subsequently received write or delete request/s associated with the restored DHT node to the restored DHT node.

13. A distributed hash table (DHT), node, comprising:
   a complete distributed DHT hash table which is configured to contain information identifying a specific range of hashes for itself and to contain information identifying specific ranges of hashes for all of the other DHT nodes which are part of a DHT overlay network in a peer-to-peer (P2P) system, said DHT node including
   a bootstrapping mechanism which enables a message to be broadcast announcing the DHT node's storage capacity to the other DHT nodes, the DHT node being further configured for receiving a re-computed DHT hash table, where said DHT node is not the first DHT node in the DHT overlay network, and for submitting the re-computed DHT hash table towards other DHT nodes in the DHT overlay network, where said DHT node is the first DHT node in the DHT overlay network.

14. The DHT node of claim 13, further comprising a replication mechanism which expands the DHT hash table to include not only a main part that contains information identifying the range of hashes for all of the other DHT nodes but also a replica part that contains information identifying the range of hashes for one or more of the other DHT nodes.

15. The DHT node of claim 13, further comprising an update mechanism where upon learning that one of the other DHT nodes has crashed functions to:
   update the DHT hash table so that requests that would have been previously served by the crashed DHT node would now be served by one of the other DHT nodes which has a replica part in the DHT hash table that contains information identifying the range of hashes for the crashed DHT node, and
   re-distribute the updated DHT hash table to the remaining other DHT nodes.

16. The DHT node of claim 15, wherein said update mechanism uses a topology-based replica (TRL) function to determine the one of the other DHT nodes which has the replica part in the DHT hash table that contains information identifying the range of hashes for the crashed DHT node.

17. The DHT node of claim 13, further comprising a recover mechanism where upon learning that a crashed DHT node is attempting to restore itself functions to:
   mark every received write or delete request associated with the restored DHT node;
   send replicated records associated with the restored DHT node back to the restored DHT node;
   transmit record/s that have been changed in response to receiving the marked write or delete request/s to the restored DHT node;
   store and not attend to subsequently received write or delete request/s associated with the restored DHT node;
   receive a message indicating that the restored DHT node is now active;
   update the DHT hash table to indicate that the restored DHT node is now active; and
   send the stored subsequently received write or delete request/s associated with the restored DHT node to the restored DHT node.

* * * * *

UNITED STATES PATENT AND TRADEMARK OFFICE
CERTIFICATE OF CORRECTION

| | | |
|---|---|---|
| PATENT NO. | : 8,255,736 B2 | |
| APPLICATION NO. | : 12/528239 | |
| DATED | : August 28, 2012 | |
| INVENTOR(S) | : Ag ndez Dominguez et al. | |

It is certified that error appears in the above-identified patent and that said Letters Patent is hereby corrected as shown below:

In Column 5, Line 3, delete "Amore" and insert -- A more --, therefor.

In Column 7, Line 50, delete "RDDR" and insert -- RDRR --, therefor.

In Column 11, Line 45, delete "Incase" and insert -- In case --, therefor.

In Column 13, Line 21, in Claim 6, delete "fable" and insert -- table --, therefor.

In Column 13, Line 54, in Claim 7, delete "overly" and insert -- overlay --, therefor.

In Column 14, Line 27, in Claim 12, delete "further," and insert -- further --, therefor.

In Column 14, Line 28, in Claim 12, delete "where" and insert -- where, --, therefor.

Signed and Sealed this
Twentieth Day of November, 2012

David J. Kappos
*Director of the United States Patent and Trademark Office*